US005998757A

United States Patent [19]

[11] Patent Number: 5,998,757

[45] Date of Patent: Dec. 7, 1999

Schneider

[54] PLASMA TORCH SYSTEM WITH HEIGHT ADJUSTMENT

[75] Inventor: Gottfried Schneider, Stuttgart, Germany

[73] Assignee: Deutsches Zentrum Fuer Luft- und Raumfahrt e.V., Bonn, Germany

[21] Appl. No.: 09/199,109

[22] Filed: Nov. 24, 1998

Related U.S. Application Data

[63] Continuation of application No. PCT/EP98/01793, Mar. 26, 1998.

[30] Foreign Application Priority Data

Mar. 29, 1997 [DE] Germany ........................... 197 13 352

[51] Int. Cl.[6] .............................. B23K 10/00; H05H 1/30

[52] U.S. Cl. ............................... 219/121.54; 219/121.47; 219/121.56; 219/121.36; 427/446; 118/723 R

[58] Field of Search ........................... 218/121.47, 76.16, 218/121.48, 121.56, 121.36; 427/562, 563, 571, 446; 118/719, 723 I, 728, 723 R

[56] References Cited

U.S. PATENT DOCUMENTS

| | | | |
|---|---|---|---|
| 4,424,102 | 1/1984 | Brandeis et al. . | |
| 4,820,900 | 4/1989 | Höhle et al. | 219/121.47 |
| 4,884,625 | 12/1989 | Paton et al. . | |
| 5,254,830 | 10/1993 | Zarowin et al. | 219/121.43 |
| 5,453,305 | 9/1995 | Lee | 427/562 |
| 5,858,100 | 1/1999 | Maeda et al. | 118/719 |
| 5,861,601 | 1/1999 | Sato et al. | 219/121.43 |

FOREIGN PATENT DOCUMENTS

| | | |
|---|---|---|
| 0 281 158 | 9/1988 | European Pat. Off. . |
| 0 710 054 | 5/1996 | European Pat. Off. . |
| 29 06 751 | 11/1979 | Germany . |
| 35 44 119 | 6/1987 | Germany . |
| WO 92/19086 | 10/1992 | WIPO . |

*Primary Examiner*—Mark Paschall
*Attorney, Agent, or Firm*—Barry R. Lipsitz; Ralph F. Hoppin

[57] ABSTRACT

To improve a plasma torch system comprising a high-frequency plasma torch with a plasma torch device for generating therein a plasma flame by supplying high-frequency power, and a processing chamber for positioning therein workpieces which are to be processed by means of the plasma flame, so that it is universally usable, it is proposed that the plasma torch system comprise a height adjustment device for adjustment of a vertical distance between the plasma torch device of the high-frequency plasma torch and a workpiece which is to be processed.

32 Claims, 3 Drawing Sheets

PLASMA TORCH SYSTEM WITH HEIGHT ADJUSTMENT

The present application is a continuation of the subject matter disclosed in International Application PCT/EP98/01793 of Mar. 26, 1998, the entire specification of which is incorporated herein by reference.

BACKGROUND OF THE INVENTION

The invention relates to a plasma torch system comprising a high-frequency plasma torch with a plasma torch device for generating therein a plasma flame by supplying high-frequency power, and a processing chamber for positioning therein workpieces which are to be processed by means of the plasma flame.

The invention further relates to a method of operating a plasma torch system comprising a high-frequency plasma torch with a plasma torch device for generating a plasma flame and a processing chamber for processing a workpiece with the aid of the plasma flame.

Such plasma torches can be used, for example, for coating workpieces or for evaporation coating, in which case, an additive such as a metal powder is introduced into the plasma flame and is deposited as coating or as evaporated layer on the workpiece. Herein, the plasma flame is generated by high-frequency heating, for example, by high-frequency induction heating or by high-frequency heating in cavity resonators.

SUMMARY OF THE INVENTION

The object underlying the present invention is to so improve a plasma torch system with the features set forth at the outset that it is universally usable.

This object is accomplished with the inventive plasma torch system having the features set forth at the outset by the plasma torch system comprising a height adjustment device for adjustment of a vertical distance between the plasma torch device of the high-frequency plasma torch and a workpiece which is to be processed.

With the inventive plasma torch system, an optimum vertical distance can thus be set between the workpiece and the plasma flame generated in the plasma torch device. It is thereby possible to process a large number of workpieces having different workpiece geometries with the inventive plasma torch system. An exact following of the contours is achievable even with unfavorably or awkwardly shaped workpiece geometries. Better use can be made of the processing chamber in the case of workpieces having a large height as a restriction of the field of view, for example, for applying an additive to the workpiece is avoidable due to optimized height adjustment by adaptation of the vertical distance.

It is particularly expedient for high-frequency lines from an adapter serving to couple the high-frequency power of a high-frequency generator into the high-frequency lines to be led rigidly to the plasma torch device of the high-frequency plasma torch. To generate the plasma flame, the plasma torch device must be supplied with high-frequency power via the high-frequency lines. To transmit a high high-frequency power and to couple this high-frequency power optimally into a working gas for generation of the plasma flame, the adapter must be tuned to the high-frequency lines and the plasma torch device, in particular, with respect to the characteristic impedance. Owing to the rigid conductance of the high-frequency lines it is ensured that on adjusting the vertical distance between the plasma torch device and the workpiece which is to be processed, the tuning by the adapter is maintained and, therefore, with an adapter once tuned, the same high-frequency power is coupled into the plasma torch device upon each height adjustment, and the plasma flame then always exhibits the same characteristics.

In an expedient variant of an embodiment, the high-frequency lines are in the form of line resonators so as to enable transmission of a high high-frequency power to the plasma torch device.

It is particularly expedient for the high-frequency plasma torch to be displaceable with the plasma torch device by the height adjustment device in a vertical direction in relation to the workpiece which is to be processed. The high-frequency plasma torch is thus displaceable relative to the workpiece which, in particular, then only needs to be displaceable in an x-y plane perpendicularly to the vertical direction in the processing chamber. The x-y movement of the workpiece can thus be uncoupled from the vertical z movement as the latter is effected by a displacement of the high-frequency plasma torch. A positioning device can thus be employed for moving the workpiece in the processing chamber with little expenditure and with low susceptibility to operational failure. In particular, this is highly advantageous when the processing chamber is a vacuum chamber and the workpieces are to be processed in a vacuum with the aid of the plasma flame. With the adjustment of the vertical distance by means of height adjustment of the high-frequency plasma torch, particularly when the workpieces are spaced at a short distance from the high-frequency plasma torch, higher accuracies are achievable than if a positioning device had to move a workpiece in all three directions in space (x, y, z).

It is expedient for the adapter to be arranged at a fixed distance from the high-frequency plasma torch and to be displaceable therewith. It is thus ensured that the high-frequency lines between the adapter and the plasma torch device are not subjected to any stretching or compression, which would make re-tuning of the adapter necessary.

In a variant of an embodiment, the high-frequency generator is fixedly mounted in relation to the adapter so as to be displaceable with the high-frequency plasma torch. This is particularly advantageous when the coupling of the high-frequency power from the high-frequency generator into the adapter is critical because this coupling is then not altered by a displacement of the high-frequency plasma torch.

Provision may also be made for the high-frequency generator to be fixedly mounted in relation to the processing chamber. The mass which has to be moved upon displacement of the plasma torch is thereby reduced because the high-frequency generator itself does not have to be displaced along with it.

In a particularly advantageous embodiment of the inventive apparatus, the adapter is tunable to optimize the high-frequency power input through the high-frequency lines to the plasma torch device. The high-frequency heating can thereby be optimized so as to couple a high power into a working gas for generation of the plasma flame, and when making changes to the system design, for example, shortening or lengthening the high-frequency lines or exchanging the plasma torch device, tuning to a new optimum power input value can be carried out.

In an embodiment of particularly simple construction, the high-frequency plasma torch is held on a sliding guide means of the height adjustment device which is displaceable in the vertical direction.

It is then expedient for feed lines for the plasma torch to lead through the sliding guide means so as to thus ensure feeding of supply media to the high-frequency plasma torch.

The feed lines comprise the high-frequency lines to the plasma torch device which can thus be rigidly conducted. The feed lines also comprise a working gas feed line to the plasma torch device, the working gas being a burner gas serving to generate plasma. The feed lines further comprise a coolant feed line to the plasma torch device and a coolant exhaust line from the plasma torch device.

In an advantageous variant of the inventive apparatus, the feed lines also comprise an additive feed line to the plasma torch device, the additive being used, for example, as coating agent. In an expedient variant of an embodiment, the additive feed line comprises a nozzle for blowing additive into the plasma flame. The plasma flame is thus optimally usable for applying additive to the workpiece which is to be processed.

In an advantageous variant of an embodiment, the sliding guide means comprises a coolant feed line and a coolant exhaust line for acting upon the high-frequency lines in the sliding guide means with coolant. By cooling the high-frequency lines, the high-frequency power input into the plasma torch device can thus be further improved.

In accordance with the invention, provision may be made for the processing chamber to be in the form of a vacuum chamber. This is particularly advantageous when the inventive plasma torch system is used for coating workpieces for avoidance of contamination of the workpiece surfaces and the coating materials depositing on the workpieces.

The sliding guide means expediently comprises a sealing device for gas-tight sealing from the processing chamber so a disconnection from the gas or vacuum atmosphere of the processing chamber is provided. It is expedient for the sealing device to be formed by a diaphragm bellows for ensuring an extremely elastic, radially pressure-proof sealing.

It is then also expedient for the sliding guide means to comprise a seal by means of which an interior of the sliding guide means is sealed off gas-tight from an outside space of the plasma torch system. In this way, the interior of the sliding guide means can be acted upon with a medium. It is advantageous for the active medium to be a protective medium for suppressing high-frequency sparkovers. The active medium can be gaseous. For example, $SF_6$ is conceivable as protective gas for suppressing high-frequency sparkovers. It is also conceivable for, for example, silicone oil to be used as liquid active medium.

It is advantageous for the active medium to be conducted through the interior of the sliding guide means for cooling the high-frequency lines. A combination effect of the active medium as sparkover suppressing medium and as cooling medium is then particularly expedient.

In a variant of an embodiment which is of particularly simple construction, the sliding guide means is formed by a slide pipe.

Constructional advantages are also obtained by the adapter being held by frictional engagement in relation to the sliding guide means at a fixed distance from the high-frequency plasma torch.

This is achievable in an expedient variant of an embodiment by a holding element on which the adapter is fixed being arranged by frictional engagement on the sliding guide means at a fixed distance from the high-frequency plasma torch.

To achieve an exact and simple height adjustment, it is advantageous for the height adjustment device to comprise an adjusting drive. It is expedient for the height adjustment device to further comprise a control unit for controlling the vertical distance of the high-frequency plasma torch relative to the workpiece in order to ensure an exact and precise setting of the vertical distances between the plasma torch device and the workpiece.

To increase the operational safety of the inventive plasma torch system, provision is made for the processing chamber to be earthed. Plasma torch systems are known from the prior art wherein the high-frequency plasma torches are fed symmetrically from an adapter, and to avoid the danger of sparkovers within a vacuum chamber such chambers are operated unearthed in order to keep chamber walls at a floating potential and thereby avoid sparkovers. Such high-frequency sparkovers can be reduced or avoided by the inventive plasma torch system.

In an advantageous variant of an embodiment a positioning device for positioning the workpiece which is to be processed relative to the high-frequency plasma torch is arranged in the processing chamber. The workpiece can thereby be moved and positioned within the processing chamber so as to enable, in particular, a following of the workpiece for processing by means of the plasma flame. The workpiece is positionable in a horizontal plane perpendicularly to the vertical direction by the positioning device. Provision may also be made for the workpiece to be positionable in the vertical direction by the positioning device. This can, for example, be used for a prepositioning or rough positioning of the vertical distance between the workpiece and the plasma torch device.

In an expedient variant of an embodiment, the height adjustment device is held on a holding device which is mounted so as to be fixably displaceable in relation to the processing chamber. This enables simple accessibility and exchangeability of the high-frequency plasma torch of the plasma torch system by, for example, a connection between the height adjustment device and the plasma torch being released and by the height adjustment device then being moved into an unimpeding position by means of the frame.

A further object underlying the present invention is to provide a method having the features set forth at the outset which allows universal usability of a plasma torch system.

This object is accomplished in the method having the features set forth at the outset, in accordance with the invention, by a vertical distance between the high-frequency plasma torch and the workpiece being adjusted by displacement of the high-frequency plasma torch relative to the workpiece, and by an adapter by means of which high-frequency power is coupled into high-frequency lines leading to the plasma torch device being arranged at a fixed distance from the plasma torch so that the high-frequency lines can be rigidly conducted.

The advantages of the inventive method were already discussed in conjunction with the inventive apparatus.

DETAILED DESCRIPTION OF THE INVENTION

Figure 1:
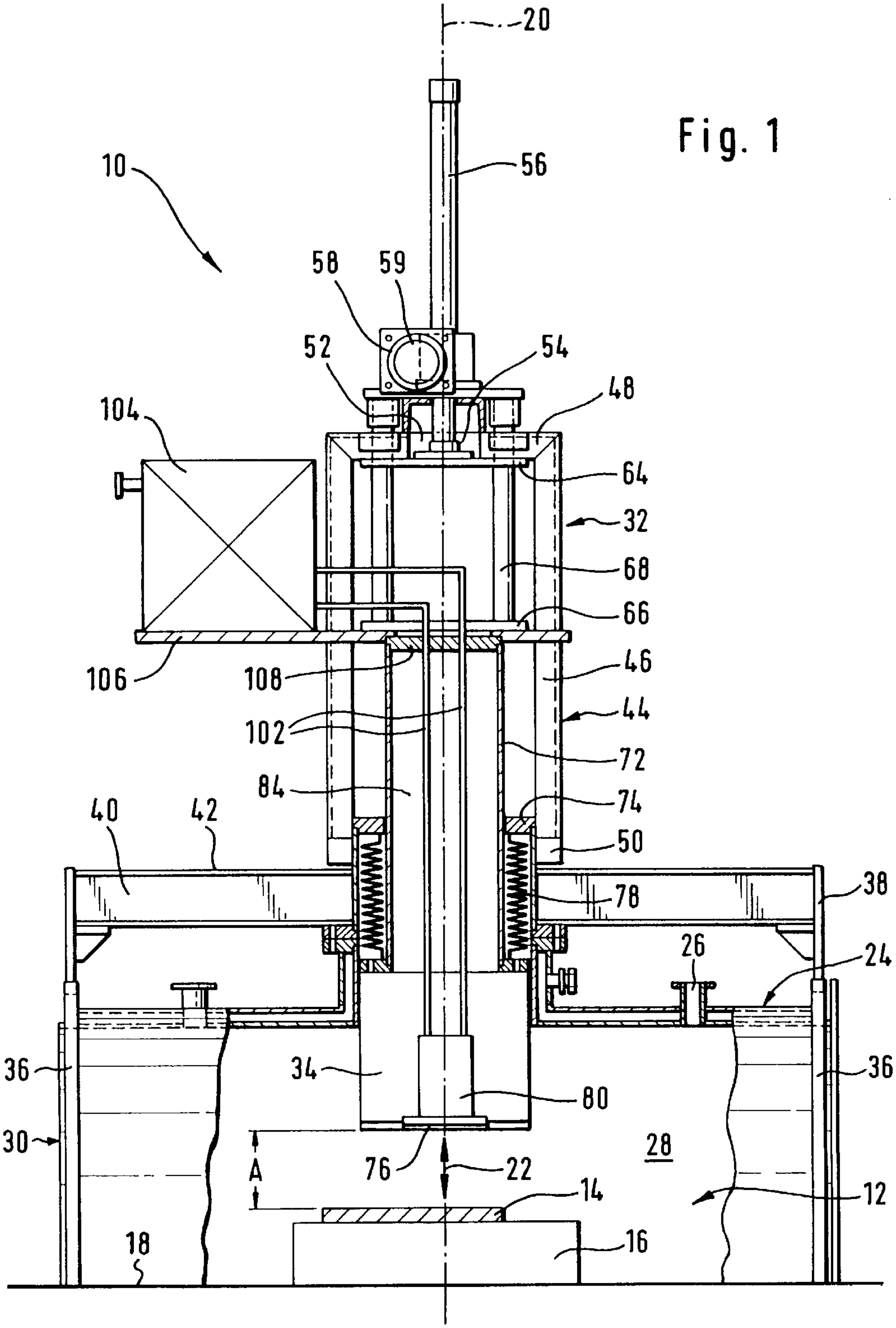
FIG. 1 a front sectional view of an inventive plasma torch system.

An embodiment of an inventive plasma torch system, generally designated 10 in FIG. 1, comprises a processing chamber 12 in which a workpiece 14 or a group of workpieces is positionable.

To this end, there is fixedly connected to a bottom 18 of the processing chamber 12 a positioning device 16 on which the workpiece 14 is fixable. The positioning device 16 allows displacement of the workpiece 14 in a plane x-y which is perpendicular to a vertical axis 20 (z axis) of the plasma torch system 10.

In a variant of an embodiment, provision is made for the positioning device 16 to also include positioning in a vertical direction 22 (z direction) parallel to the vertical axis 20.

Figure 2:
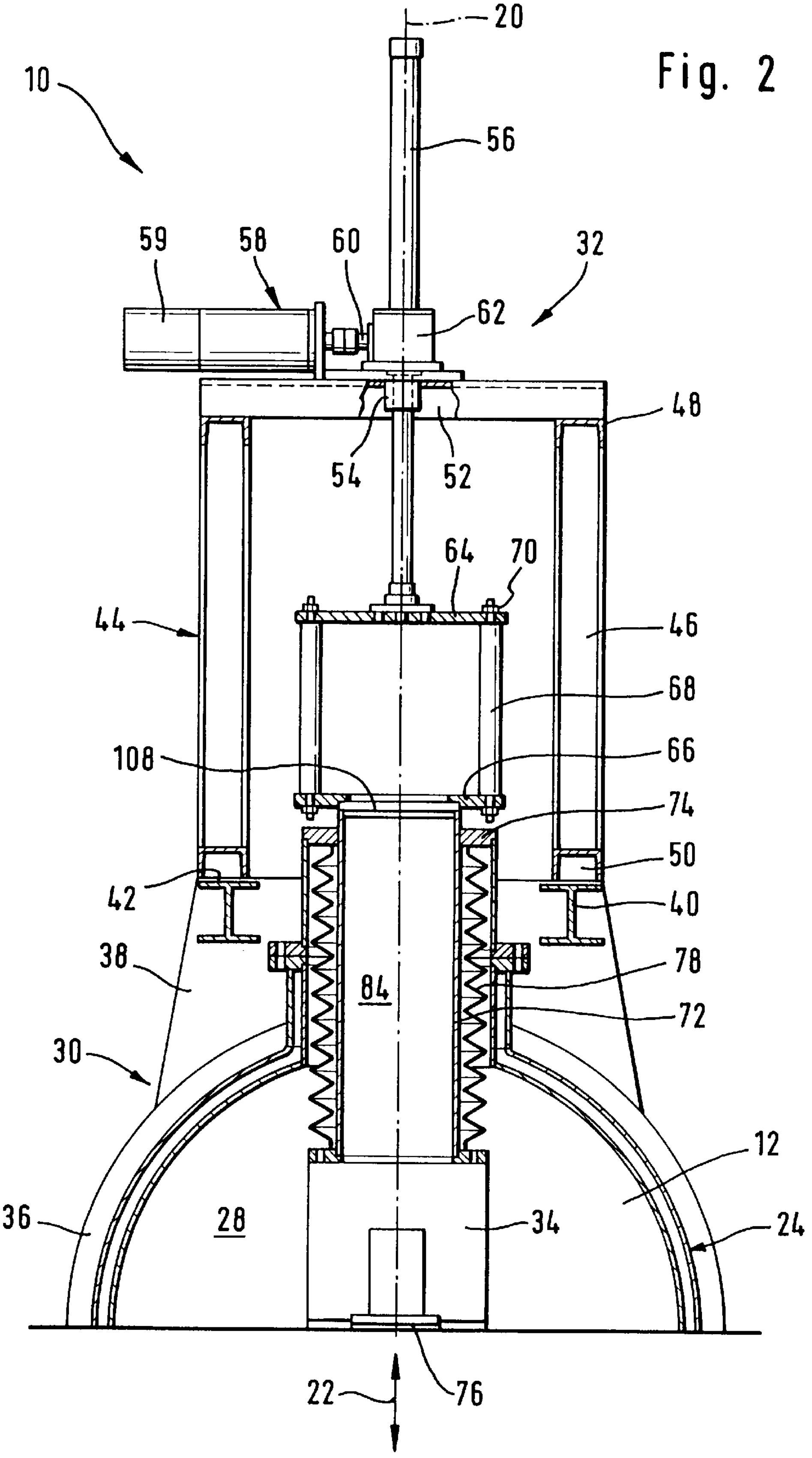
FIG. 2 a side sectional view of an inventive plasma torch system.

The processing chamber 12 comprises a casing 24 which is of semicircular shape in cross section (FIG. 2). The casing 24 is made of a metallic material and earthed. In particular, it is pressure-proof and gas-tight and has connections 26 which are connected to a vacuum pump (not shown in the Figure). This enables a vacuum to be generated in a processing space 28 of the processing chamber 12 for processing the workpiece 14 in a vacuum.

There is connected to the processing chamber 12 by frictional engagement a frame structure 30 which holds a height adjustment device 32. The height adjustment device 32 holds a high-frequency plasma torch 34 in which a plasma flame can be generated for processing the workpiece 14.

The frame structure 30 comprises arcuate frame carrying elements 36 which are arranged at outer ends of semicircular cross section of the processing chamber 12. Supported on the arcuate frame carrying elements are frame supporting elements 38 which are arranged preferably symmetrically with the vertical axis 20 so as to ensure a uniform power distribution of the weight of the height adjustment device 32 onto the frame structure 30. Frame carriers 40 having, for example, an H-profile are held in the horizontal direction perpendicularly to the vertical axis 20 by the frame supporting elements.

There is formed by the frame carriers 40 a holding base 42 on which a holding device 44 of the height adjustment device 32 is held. The holding device 44 comprises holding elements 46 which are arranged parallel to the vertical axis 20. In particular, these are arranged symmetrically with the vertical axis 20 and are joined at their top end by a top plate 48.

The holding device 44 formed by the holding elements 46 and the top plate 48 is mounted on bearings 50 so as to be displaceable perpendicularly to the vertical axis 20 and perpendicularly to the direction of the frame carriers 40. The holding device 44 comprises fixing means (not shown in the Figure) by means of which the holding device 44 is fixable by frictional engagement on the frame carriers 40 so as to be releasable again.

The top plate 48 has at its center coaxially with the vertical axis 20 an opening 52 in which a guide 54 is arranged. There extends through this opening 52 coaxially with the vertical axis 20 a spindle 56 which is guided for displacement in z direction 22. The spindle 56 is adjustably displaceable in z direction 22 by an adjusting drive 58 held by the top plate 48. To this end, the adjusting drive comprises a shaft 60 and a conversion unit 62 by means of which a rotation of the shaft 60 is converted into a z movement of the spindle 56. The adjusting drive 58 and hence the movement of the spindle 56 are controlled by a control unit 59.

The adjusting drive 58 can, for example, be an electric drive or a hydraulic drive.

At its lower end facing the processing chamber 12, the spindle 56 is connected by frictional engagement to a first assembly plate 64. The first assembly plate 64 is connected by frictional engagement to a second assembly plate 66 (FIG. 2) which is arranged so as to face the processing chamber 12. To this end, carriers 68 arranged between first assembly plate 64 and second assembly plate 66 parallel to the vertical axis 20 are joined preferably in the proximity of an outer edge of the first assembly plate 64 and the second assembly plate 66, respectively, to these via releasable connections 70, in particular, via screw connections.

Held by frictional engagement on the second, lower assembly plate 66 is a sliding guide means 72 which extends coaxially with the vertical axis 20 in the direction of the processing chamber 12. In particular, the sliding guide means 72 is in the form of a slide pipe.

Seated on the holding elements 46 of the holding device 44 are guides 74 for vertical guidance of the sliding guide means 72 in order to ensure its displaceability in z direction.

The high-frequency plasma torch 34 is held at a lower end of the sliding guide means 72 and owing to the displaceability of the spindle 56 by the adjusting drive 58 is displaceable with the sliding guide means 72 in z direction 22 in the processing space 28 of the processing chamber 12 so that a vertical distance A between the workpiece 14 which is to be processed and an outlet 76 of the high-frequency plasma torch 34 is adjustable by the height adjustment device 32.

Arranged on the sliding guide means 72 is a sealing device 78 by means of which the sliding guide means 72 is sealed off gas-tight from the processing space 28 of the processing chamber 12. In particular, this is a diaphragm bellows which ensures pressure-proof sealing during the vertical movement of the high-frequency plasma torch.

Figure 3:
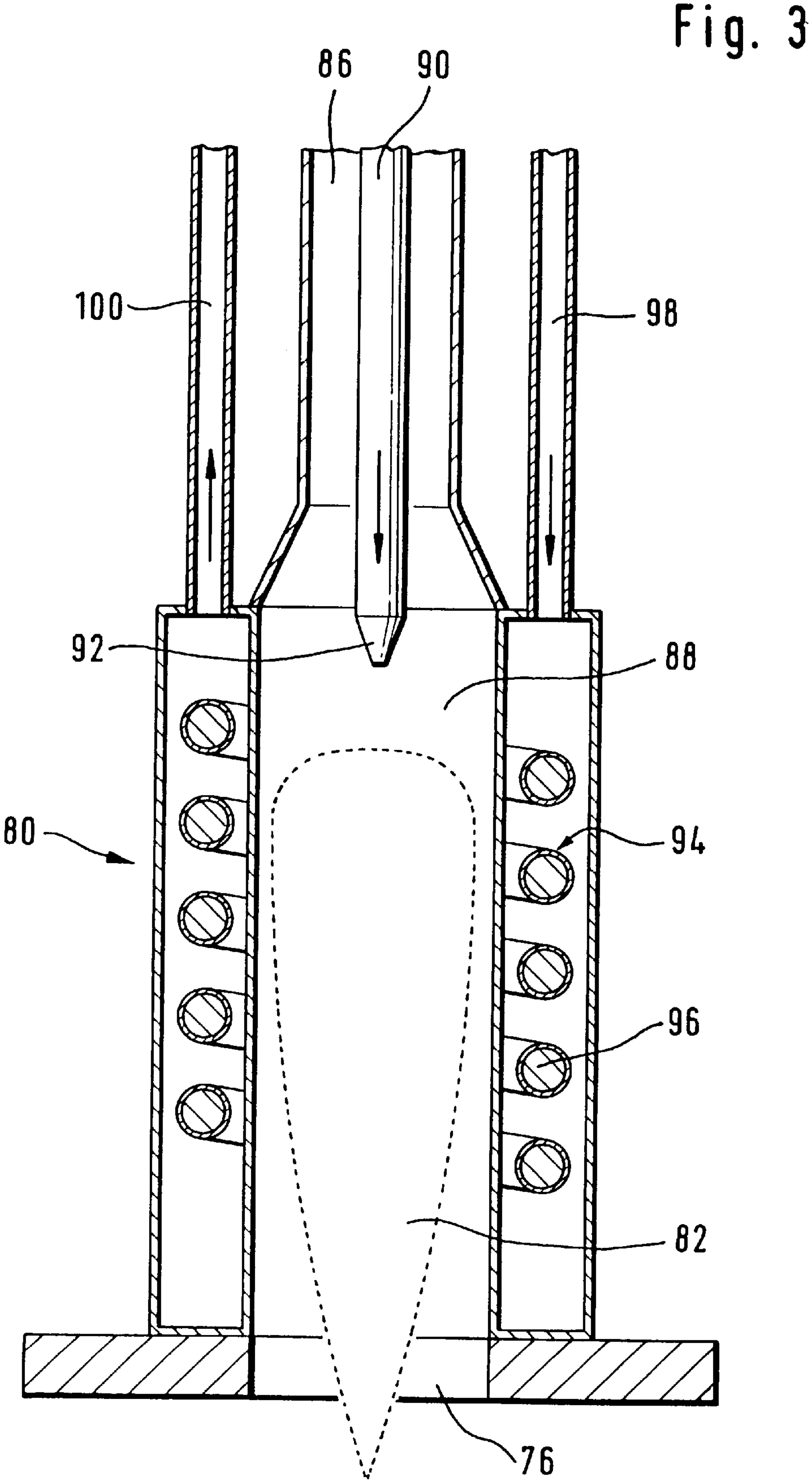
FIG. 3 a schematic illustration of a plasma torch device.

The high-frequency plasma torch comprises a plasma torch device 80 (FIG. 3) in which a plasma flame 82 can be generated by supplying high-frequency power.

A feed line 86 for working gas (not shown in FIGS. 1 and 2) leads from a working gas supply unit through an interior 84 of the sliding guide means 72 to a combustion space 88 of the plasma torch device 80 of the high-frequency plasma torch 34. Hydrogen or argon can, for example, be used as working gas which serves as plasma medium in the plasma torch device 80. From an additive supply unit (not shown in the Figure) there leads a feed line 90 for additive through the interior 84 of the sliding guide means 72 into the combustion space 88 of the plasma torch device 80. At its entrance into the combustion space 88, the feed line 90 for additive has a nozzle 92 through which, in particular, powdered additive is introducible into the plasma flame 82. The additive which can be, for example, a metal powder, serves, for example, as evaporation material for the workpiece 14 and, to this end, is injected into the plasma flame 82 for heating.

The plasma torch device comprises high-frequency coupling means 94 for coupling high-frequency power into the working gas to generate the plasma flame 82. In particular, this coupling can be carried out inductively, and the high-frequency power coupling means 94 can then be formed by an induction coil. However, provision may also be made for the high-frequency power coupling means 94 to be formed by a cavity resonator.

In a variant of an embodiment, the high-frequency power coupling means 94 is a stay cast coil wherein the coil windings 96 are cast into a fabric material. Such a stay cast coil allows a high input of power into the working gas. For cooling the high-frequency power coupling means 94, coolant feed lines 98 and coolant exhaust lines 100 are led through the interior 84 of the sliding guide means 72 to the high-frequency power coupling means 94 (not shown in FIGS. 1 and 2).

For supplying the high-frequency power coupling means 94 with high-frequency power, high-frequency lines 102 are led from an adapter 104 to the plasma torch device 80 through the interior 84 of the sliding guide means 72. The adapter is arranged on a holding element 106 which is connected by frictional engagement to the sliding guide means 72. Consequently, the distance between the adapter 104 and the high-frequency plasma torch 34 with its plasma torch device 80 is constant for each vertical distance A and is not changed by a displacement in z direction 22 of the high-frequency plasma torch 34. The high-frequency lines 102 are rigidly conducted between the adapter 104 and the plasma torch device 80. These high-frequency lines 102 can, in particular, be high-frequency lines in the form of line resonators which are formed, for example, by copper pipes with a rectangular cross section.

The adapter 104 is connected to a high-frequency generator (not shown in the Figure) which generates the high-frequency power. In a variant of an embodiment, this high-frequency generator is fixedly mounted in relation to the processing chamber 12 so that it is not displaced upon an adjustment in height of the high-frequency plasma torch 34. Feed lines (not shown in the Figure) between the high-frequency generator and the adapter 104 must then be of flexible design.

In another variant of an embodiment, the high-frequency generator is held on the holding element 106 fixedly in relation to the adapter 104.

The adapter 104 serves to optimize the supply of high-frequency power to the plasma torch device 80. In particular, it enables tuning to the characteristic impedance of the high-frequency lines 102 and the plasma torch device 80. As the high-frequency lines 102 are rigid in relation to the adapter 104 and the plasma torch device 80, a tuning once adjusted will not be destroyed by a vertical displacement in z direction 22.

At an upper end facing away from the processing chamber 12, the sliding guide means 72 has a seal 108 by means of which the interior 84 of the sliding guide means 72 is gas-tight relative to an outside space of the plasma torch system 10. The high-frequency lines 102 are led through this seal 108. Also guided through the seal 108 are the feed line 90 for additive, the coolant feed lines 98 for the high-frequency power coupling means 94 and the corresponding coolant exhaust lines 100. The feed line 90 and the feed lines 98 and the exhaust lines 100 are designed such that their functionability is not affected by a displacement in z direction of the high-frequency plasma torch 34. This can, for example, be achieved by these being of flexible design outside the interior 84 of the sliding guide means 72. In a variant of an embodiment of the inventive plasma torch system 10, provision is made for the interior 84 of the sliding guide means 72 to be acted upon with a medium. In particular, this medium can be a protective medium for suppressing high-frequency sparkovers in the high-frequency lines 102 which run in the interior 84. $SF_6$ or silicone oil can, for example, be used.

In a variant of an embodiment, provision is made for the active medium to be conducted through the interior 84 of the sliding guide means 72 in order to thereby cool the high-frequency lines 102 in the interior 84. The combining of the active medium as protective medium and as cooling medium is particularly advantageous.

Owing to the seal 108, a pressure level which differs from the pressure of the outside space of the plasma torch system 10 can be set in the interior 84 of the sliding guide means 72.

The inventive plasma torch system operates as follows:

High-frequency power is coupled via the high-frequency generator into the adapter 104. In particular, the adapter is tuned via adaptation to characteristic impedance such that this high-frequency power is optimally coupled via the lines 102 into the high-frequency power coupling means 94 of the plasma torch device 80 of the high-frequency plasma torch 34. The working gas which is introduced via feed line 90 into the plasma torch device 80 absorbs energy in the high-frequency fields, for example, by means of inductive high-frequency heating, and a plasma flame 82 is created. This plasma flame is oriented in z direction 22 in the direction of the workpiece 14 and is used for processing this workpiece 14.

The distance A between the workpiece and the plasma torch device 80 and, in particular, the outlet 76 and the workpiece 14 is decisive for optimum processing of the workpiece. This distance A is adjustable by the adjusting drive 58. In particular, the high-frequency plasma torch 34 can thereby follow the workpiece 14 in z direction 22, for example, when this has contour structures in the vertical direction.

The processing of the workpiece 14 can, for example, consist of vacuum coating by evaporation. To this end, there is introduced into the plasma flame 82 via the nozzle 92 an additive which serves as evaporation agent for deposition on the workpiece 14.

The positioning device 16 allows movement of the workpiece in an x-y plane perpendicularly to the z direction 22. The movement in z direction and hence the adjustment of the vertical distance A are carried out via the height adjustment device 32. Provision may also be made for the positioning device 16 to allow a positioning of the workpiece 14 in the z direction 22, for example, as rough adjustment or pre-positioning.

The coupling of high-frequency power into the high-frequency power coupling means 94 is particularly critical with respect to changes in the geometry of the high-frequency lines 102, as, in particular, an adaptation to the characteristic impedance by the adapter 104 is eliminated by changes in the geometry. In the inventive plasma torch system 10, the adapter 104 is always held at a fixed distance from the plasma torch device 80, and the lines 102 are of rigid construction so that, in particular, their geometrical shape does not change. Consequently, no harmful stress on the high-frequency lines 102 occurs by an adjustment of the vertical distance A between high-frequency plasma torch 34 and workpiece 14 and so the tuning of the adapter 104 is maintained.

By coupling the x-y movement of the workpiece on the positioning device 16 and the movement in z direction 22 of the high-frequency plasma torch 34 via the control unit 59, the processing, for example, the evaporation coating, of workpieces 14 or groups of workpieces 14, can be optimized by an exact following of the contours and adaptation in all three directions in space being enabled.

The holding device 44 is mounted so as to be fixably displaceable on the bearings 50. This facilitates assembly and disassembly of the inventive plasma torch system 10. By releasing the connections 70, the spindle 56 can be disconnected from the sliding guide means 72 and the holding device 44 then shifted so as not to impede further assembly or disassembly of the high-frequency plasma torch 34. In this way, the high-frequency plasma torch 34 is, for example, quickly exchangeable.

What is claimed is:

1. A plasma torch system, comprising:

a high-frequency plasma torch with a plasma torch device for generating therein a plasma flame by supplying high-frequency power, a processing chamber for positioning therein workpieces which are to be processed by means of said plasma flame, a height adjustment device for adjustment of a vertical distance (A) between said plasma torch device and a workpiece which is to be processed;

said high-frequency plasma torch being displaceable with said plasma torch device by said height adjustment device in a vertical direction in relation to the workpiece; and high-frequency lines which are led rigidly from an adapter serving to couple the high-frequency power of a high-frequency generator into said high-frequency lines to said plasma torch device;

wherein said adapter is arranged at a fixed distance from said high-frequency plasma torch and is displaceable therewith.

2. Plasma torch system as defined in claim 1, characterized in that said high-frequency lines (102) are in the form of line resonators.

3. Plasma torch system as defined in claim 1, characterized in that said high-frequency generator is fixedly mounted in relation to said adapter (104) so as to be displaceable with said high-frequency plasma torch (34).

4. Plasma torch system as defined in claim 1, characterized in that said high-frequency generator is fixedly mounted in relation to said processing chamber (12).

5. Plasma torch system as defined in claim 1, characterized in that said adapter (104) is tunable for optimization of the supply of high-frequency power through said high-frequency lines (102) to said plasma torch device (80).

6. Plasma torch system as defined in claim 1, characterized in that said high-frequency plasma torch (34) is held on a sliding guide means (72) of said height adjustment device (32), said sliding guide means (72) being displaceable in said vertical direction (22).

7. Plasma torch system as defined in claim 6, characterized in that feed lines for said high-frequency plasma torch (34) lead through said sliding guide means (72).

8. Plasma torch system as defined in claim 7, characterized in that said feed lines comprise said high-frequency lines (102) to said plasma torch device (80).

9. Plasma torch system as defined in claim 7, characterized in-that said feed lines comprise a working gas feed line (86) to said plasma torch device (80).

10. Plasma torch system as defined in claim 7, characterized in that said feed lines comprise a coolant feed line (98) to said plasma torch device (80) and a coolant exhaust line (100) from said plasma torch device (80).

11. Plasma torch system as defined in claim 7, characterized in that said feed lines comprise an additive feed line (90) to said plasma torch device (80).

12. Plasma torch system as defined in claim 11, characterized in that said additive feed line (90) comprises a nozzle (92) for blowing additive into said plasma flame (82).

13. Plasma torch system as defined in claim 8, characterized in that said sliding guide means (72) comprises a coolant feed line and a coolant exhaust line for acting upon said high-frequency lines (102) in said sliding guide means (72) with coolant.

14. Plasma torch system as defined in claim 1, characterized in that said processing chamber (12) is in the form of a vacuum chamber.

15. Plasma torch system as defined in claim 6, characterized in that said sliding guide means (72) comprises a sealing device (78) for gas-tight sealing from said processing chamber (12).

16. Plasma torch system as defined in claim 15, characterized in that said sealing device (78) is formed by a diaphragm bellows.

17. Plasma torch system as defined in claim 6, characterized in that said sliding guide means (72) comprises a seal (108) by means of which an interior (84) of said sliding guide means (82) is sealed off gas-tight from an outside space of said plasma torch system (10).

18. Plasma torch system as defined in claim 17, characterized in that the interior of said sliding guide means (72) is adapted so as to be acted upon with an active medium.

19. Plasma torch system as defined in claim 18, characterized in that said active medium is a protective medium for suppressing high-frequency sparkovers.

20. Plasma torch system as defined in claim 18, characterized in that said active medium is conducted through said interior (84) of said sliding guide means (72) to cool said high-frequency lines (102).

21. Plasma torch system as defined in claim 6, characterized in that said sliding guide means (72) is formed by a slide pipe.

22. Plasma torch system as defined in claim 6, characterized in that said adapter (104) is held by frictional engagement in relation to said sliding guide means (72) at a fixed distance from said high-frequency plasma torch (34).

23. Plasma torch system as defined in claim 22, characterized in that a holding element (106) with said adapter (104) fixed thereon is arranged by frictional engagement on said sliding guide means (72) at a fixed distance from said high-frequency plasma torch (34).

24. Plasma torch system as defined in claim 1, characterized in that said height adjustment device (32) comprises an adjusting drive (58).

25. Plasma torch system as defined in claim 1, characterized in that said height adjustment device (32) comprises a control unit (59) for controlling the vertical distance (A) of said high-frequency plasma torch (34) relative to said workpiece (14).

26. Plasma torch system as defined in claim 1, characterized in that said plasma torch device (80) comprises a high-frequency power coupling means (94) for inductively generating said plasma flame (82).

27. Plasma torch system as defined in claim 1, characterized in that said processing chamber (12) is earthed.

28. Plasma torch system as defined in claim 1, characterized in that a positioning device (16) for positioning said workpiece (14) which is to be processed relative to said high-frequency plasma torch (34) is arranged in said processing chamber (12).

29. Plasma torch system as defined in claim 28, characterized in that said workpiece (14) is positionable in a horizontal plane perpendicularly to said vertical direction (22) by said positioning device (16).

30. Plasma torch system as defined in claim 28, characterized in that said workpiece (14) is positionable in said vertical direction (22) by said positioning device (16).

31. Plasma torch system as defined in claim 1, characterized in that said height adjustment device (32) is held on a holding device (44) which is mounted so as to be fixably displaceable in relation to said processing chamber (12).

32. A method of operating a plasma torch system comprising a high-frequency plasma torch with a plasma torch device for generating a plasma flame and a processing chamber for processing a workpiece with the aid of said plasma flame, comprising the steps of:

setting a vertical distance between said high-frequency plasma torch and said workpiece by displacing said high-frequency plasma torch vertically relative to said workpiece, arranging an adapter, by means of which high-frequency power is coupled into high-frequency lines leading to said plasma torch device, at a fixed distance from said plasma torch so as to enable said high-frequency lines to be rigidly conducted, and arranging said adapter so as to be displaceable with the plasma torch.

* * * * *